United States Patent [19]

Kalokhe

[11] Patent Number: 4,508,476
[45] Date of Patent: Apr. 2, 1985

[54] ADJUSTABLE BORING TOOL

[75] Inventor: Shivdas A. Kalokhe, Clinton, Canada

[73] Assignee: Ex-Cell-O Corporation, Troy, Mich.

[21] Appl. No.: 369,855

[22] Filed: Apr. 19, 1982

[51] Int. Cl.³ .............................................. B23B 29/034
[52] U.S. Cl. .................................... 408/156; 408/159;
  408/180; 408/714; 82/1.2; 82/1.4; 409/233
[58] Field of Search ............... 408/156, 154, 155, 158,
  408/159, 164, 180, 147, 73, 74, 714; 82/1.2, 1.3,
  1.4, 1.5, 2 E, 24 A; 409/204, 224, 230, 233

[56] References Cited

U.S. PATENT DOCUMENTS

| 2,179,573 | 11/1939 | Criddle | 408/158 |
|---|---|---|---|
| 2,368,846 | 2/1945 | Klomp | 408/147 |
| 2,412,038 | 12/1946 | Freisen | 408/156 |
| 2,905,028 | 9/1959 | Massari | 82/1.2 |
| 2,916,951 | 12/1959 | Carlson et al. | 82/1.5 |
| 3,007,353 | 11/1961 | Garnett | 408/147 |
| 3,686,964 | 8/1972 | Thibaut et al. | 408/180 |
| 3,744,924 | 7/1973 | Levosinski | 408/156 |
| 3,749,508 | 7/1973 | Schukrafft | 408/180 |
| 4,351,207 | 9/1982 | Werth | 408/156 |

FOREIGN PATENT DOCUMENTS

| 0067088 | 1/1977 | Japan | 408/154 |
|---|---|---|---|
| 0391980 | 5/1933 | United Kingdom | 408/158 |

Primary Examiner—Z. R. Bilinsky
Assistant Examiner—Thomas M. Kline
Attorney, Agent, or Firm—Edward J. Timmer

[57] ABSTRACT

A boring tool is disclosed capable of positioning a tool element between a radial cutting position and a radial retracted position out of contact with the finished workpiece bore to avoid tool mark formation on the finished bore during tool withdrawal. The boring tool is simple and low cost in construction and includes a resilient tool-carrying member which extends transversely of the spindle axis in cantilever fashion for deflection by a spindle draw bar relative to a stop means on a fixed support member attachable to the spindle. During boring, the tool-carrying member is in deflecting engagement with the drawbar and, in conjunction with stop means, positions the tool thereon in a radial cutting position. For tool withdrawal, deflecting engagement is released so that the resiliency of the tool-carrying member positions the tool in a radial retracted position out of contact with the finished workpiece bore.

10 Claims, 3 Drawing Figures

ADJUSTABLE BORING TOOL

FIELD OF THE INVENTION

The present invention relates to boring tools and machines and, in particular, to a boring tool having means for positioning a tool element in a working position in contact with a workpiece and in a retracted position out of contact with the workpiece to avoid tool mark formation on the finished bore during tool withdrawal.

BACKGROUND OF THE INVENTION

Prior art workers have addressed the problem of tool mark formation when a boring tool is withdrawn from a finished bore after machining. Illustrative of these efforts is U.S. Pat. No. 2,368,846 which issued Feb. 6, 1945 of common assignee herewith and which elastically deforms a hollow boring bar by action of a centrifugal weight acting through a lever disposed inside the bar. When the boring bar is rotated, the centrifugal weight on one end of the lever causes the other end of the lever to exert a radial force on the hollow boring bore to elastically deform it to a cutting position. When rotation of the tool is stopped after machining, the lever force is removed and the resiliency of the boring bar causes it to return to a radially retracted position out of contact with the finished bore to avoid tool mark formation during tool withdrawal. U.S. Pat. Nos. 2,412,038 issued Dec. 3, 1946 and 3,744,923 issued July 10, 1973, also of common assignee herewith, both utilize an elastically deformable component in the boring tool construction to position the tool element between the cutting position and retracted position. For example, the earlier of these patents elastically deforms the web portion of a bell-shaped tool holder by a hydraulically actuated rod engaging an eccentrically disposed recess in the tool holder while the later issued patent elastically deforms a flexible diaphragm to which a tool support is affixed. And, U.S. Pat. No. 3,296,898 issued Jan. 10, 1967 employs a sliding cam action between a hydraulically actuated rod and a tool-carrying body to tilt the latter off its axis of revolution against an elastomeric ring for tool retraction purposes. U.S. Pat. No. 3,391,585 issued July 9, 1965 of common assignee herewith uses a cam mechanism to flex a T-shaped tool carrier.

Other patents which relate to boring tools having various types of mechanisms for adjusting the position of a tool element are as follows:

U.S. Pat. No. 3,433,104 issued Mar. 18, 1962
U.S. Pat. No. 3,625,625 Dec. 7, 1971
U.S. Pat. No. 3,749,508 issued July 31, 1973
U.S. Pat. No. 3,918,826 issued Nov. 11, 1975
U.S. Pat. No. 4,260,303 issued Apr. 7, 1981

An adjustable collapsing tap and an adjustable threading die are described in U.S. Pat. No. 909,749 issued Jan. 12, 1909 and U.S. Pat. No. 992,903 issued May 23, 1911, respectively.

SUMMARY OF THE INVENTION

An object of the present invention is to provide a boring tool and machine capable of positioning a tool element between a working position in engagement with a workpiece and a retracted position out of contact with the workpiece to avoid tool mark formation on the finished bore during tool withdrawal.

Another object of the present invention is to provide a boring tool with the above capability which is extremely simple in construction and low in cost and yet provides accurate positioning of the tool element.

Still another object of the present invention is to provide a boring tool with the above capability and simple construction which is adapted for attachment to or use with rotary boring machine spindles in widespread use today. The above capabilities, features and advantages are achieved in a typical embodiment of the present invention by a boring tool which is attachable to a rotary spindle having an axially movable drawbar means and which includes a resilient, tool-carrying member and means for attaching the tool-carrying member to the spindle. The tool-carrying member extends transversely of the spindle axis in cantilever fashion in the path of the drawbar means for deflecting engagement thereby to resiliently deflect the tool-carrying member away from the spindle to position a tool thereon in a radial workpiece-engaging position. When deflecting engagement is released, the tool-carrying member positions the tool in a radial retracted position closer to the spindle axis by virtue of its resiliency which causes the tool-carrying member to move toward the spindle when the drawbar means is released.

In a preferred working embodiment of the invention, the boring tool includes a fixed member adapted for attachment against the end of a rotary spindle having drawbar means movable along the spindle axis. The fixed member has aperture means therethrough coaxial with the spindle axis for permitting movement of the drawbar means through the fixed member. The boring tool also includes a tool-carrying member disposed adjacent the free side of the fixed member and having a fixed portion attached thereagainst and a resilient tool-carrying flange portion extending in cantilever fashion away from the fixed portion transversely of the spindle axis in the path of the drawbar means for deflecting engagement thereby during boring. The resilient flange portion preferably includes an axially extending portion carrying a tool element, such as a cutter, in a retracted radial position relative to the spindle axis out of contact with the workpiece when the flange portion is undeflected and in a workpiece-engaging radial position farther from the spindle axis when deflected by the drawbar means. Stop means is provided on the boring tool to control or limit the extent of deflection of the flange portion and thereby control the workpiece-engaging position of the tool element. During boring, the tool-carrying flange portion is resiliently and controllably deflected by the drawbar means in conjunction with the stop means to position the tool element in its radial cutting position. After completion of boring and during tool withdrawal, the drawbar means is completely or partially withdrawn from engagement and the resiliency of the flange portion returns it to the retracted position with the tool element out of contact with the workpiece to avoid tool mark formation on the finished bore wall.

DESCRIPTION OF PREFERRED EMBODIMENTS

Figure 1:
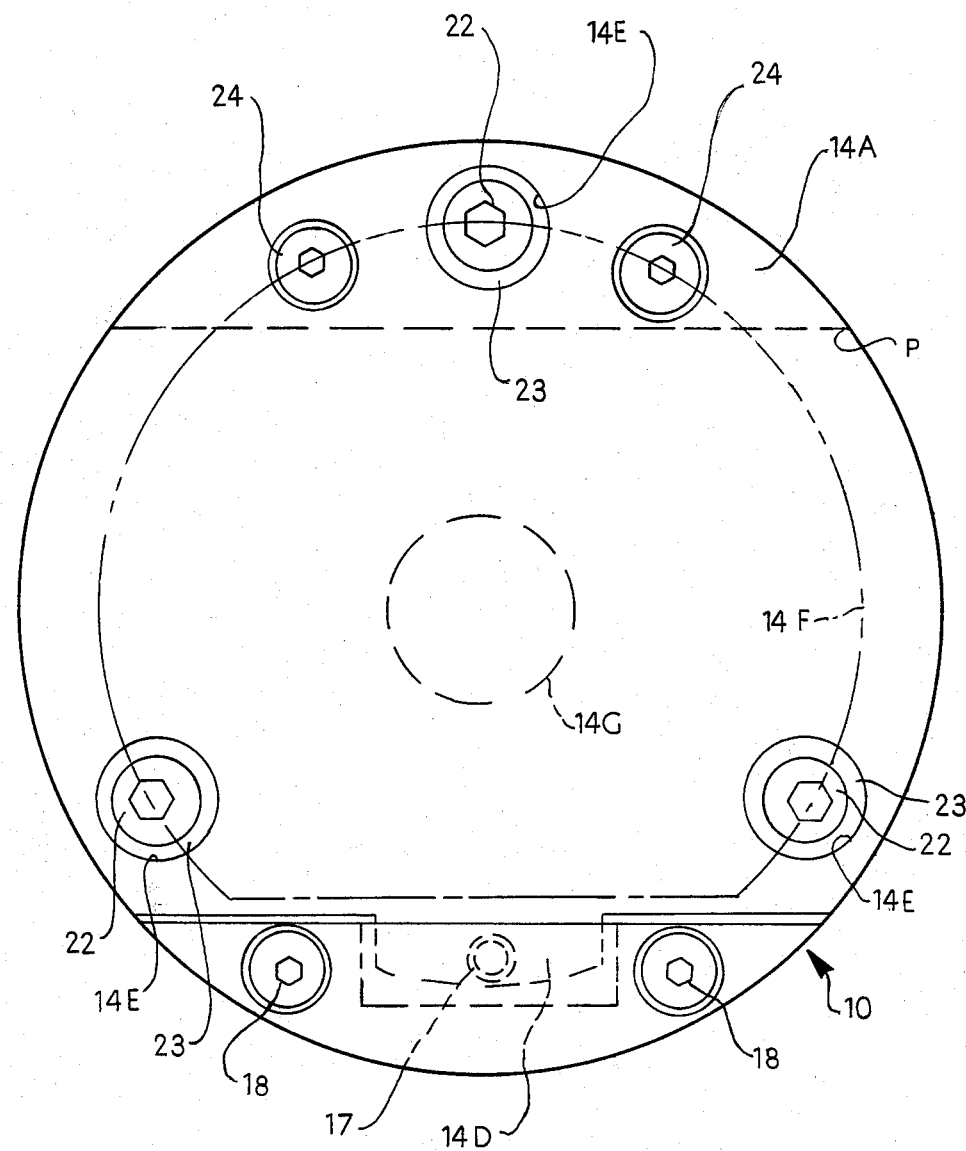
FIG. 1 is an end elevation of the boring tool with the outline of the axially-extending portion shown in phantom.
Figure 2:
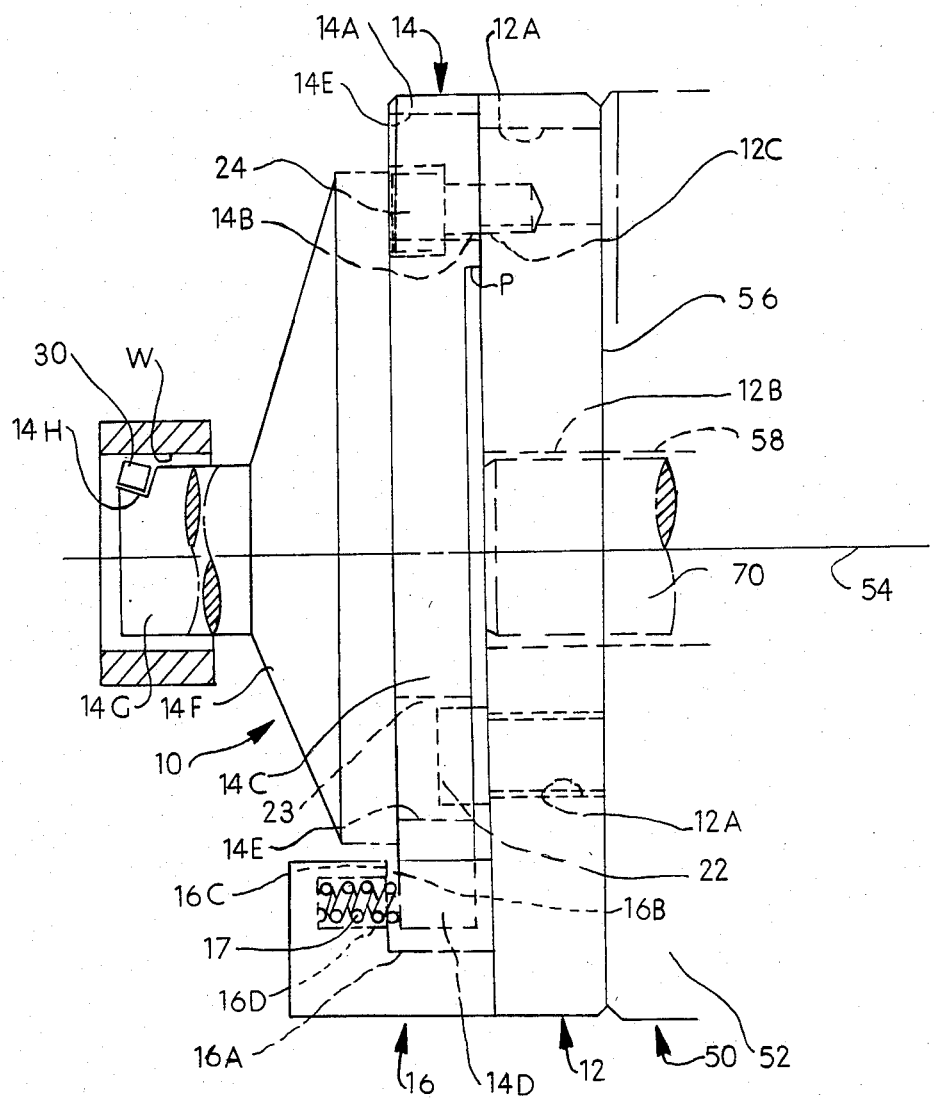
FIG. 2 is a side elevation of the boring tool of the invention attached to a rotary machine spindle having a drawbar with the tool element in a retracted radial position.
Figure 3:
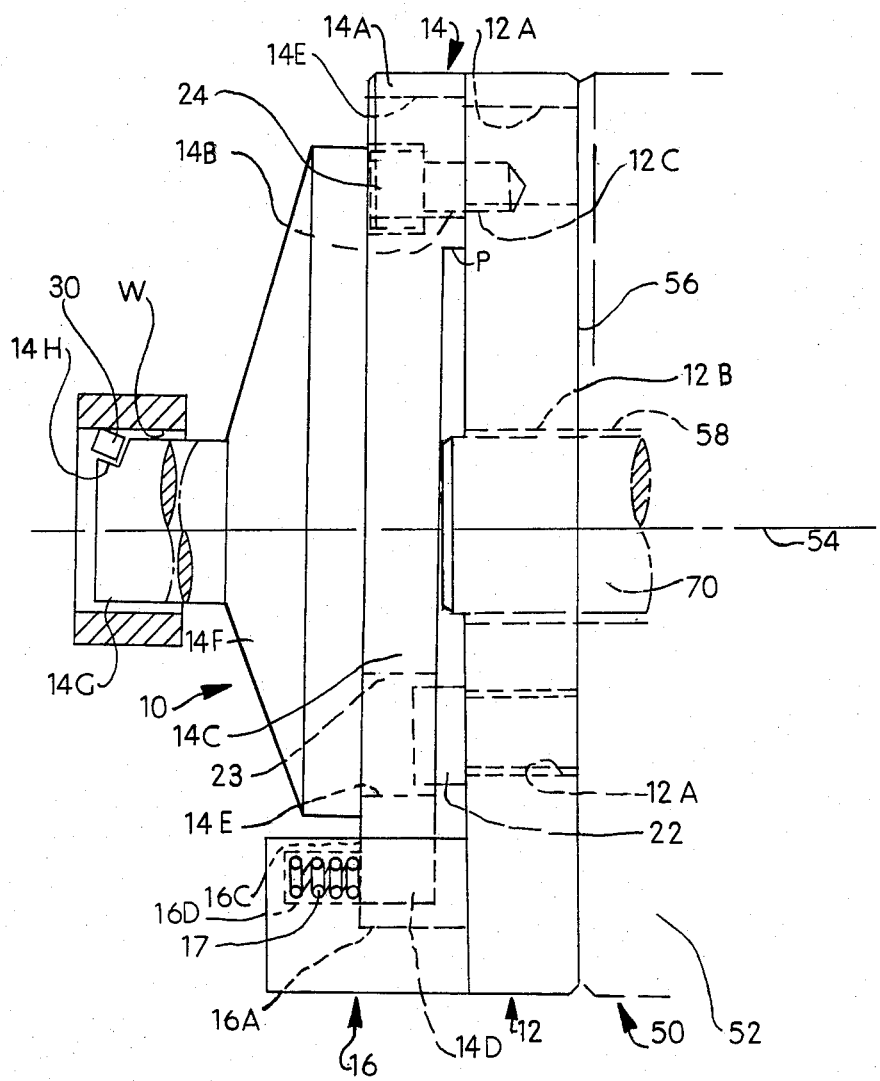
FIG. 3 is a side elevation similar to FIG. 2 but with the tool element in a workpiece-engaging radial position.

FIGS. 1-3 show a preferred boring tool 10 of the invention attached to a rotary machine spindle 50 having a drawbar 70. The rotary spindle and drawbar of the type shown are provided on many commercially available boring machines such as precision boring machine Model 742 manufactured by Ex-Cell-O Corporation, Troy, Mich. The spindle 50 comprises a hollow cylindrical member 52 having an axis of rotation 54, an end 56 and a bore 58 coaxial with the rotational axis. The spindle is mounted in the boring machine for rotation about axis 54 and also is mounted for axial movement so that the boring tool 10 can be passed through the bore being machined. Of course, boring machines having rotary spindles mounted for such combined movement are well-known in the art.

The drawbar 70, as shown, is disposed in the bore 58 of the spindle coaxial with rotational axis 54. The drawbar is mounted by means well-known to those in the art for axial movement within the bore 58 and typically does not rotate with the spindle 50. Boring machines having such drawbar means are well-known in the art.

The boring tool 10 is shown in FIGS. 1 and 2 as comprising a fixed support member 12 attached against the end 56 of the spindle, a tool-carrying member 14 attached in cantilever fashion as will be explained herebelow to fixed member 12 and stop member 16 also attached to fixed member 12.

The fixed member 12 in the form of a circular disc is mounted to the spindle end 56 transversely of its axis with circumferentially spaced, socket head cap screws 22 extending through corresponding holes 12a in the fixed member from the tool-carrying member 14 as shown and as will be further explained herebelow. Of course, the spindle 50 includes corresponding threaded holes (not shown) to threadably receive the cap screws 22. Fixed support member 12 also includes a central aperture 12b coaxial with spindle axis 54 and drawbar 70 to receive the drawbar and permit axial movement thereof through the fixed member for purposes which will become apparent.

The tool-carrying member 14 includes several important features including a lateral fixed portion 14a which is attached against the fixed support member by a pair of socket head cap screws 24 extending through axial bores 14b in the tool-carrying member and threadably received in corresponding threaded bores 12c in the fixed support member. As shown, the lateral portion 14a is defined by a chord intersecting along one side of the tool-carrying member which is provided in the general form of a circular disc. A resilient, tool-carrying flange portion 14c extends from the lateral portion 14a in cantilever fashion and transversely of the spindle axis in the path of drawbar movement. The flange portion 14c is of reduced section size compared to lateral portion 14a starting at the chord or pivot line P to enhance its resiliency and terminates in a free end or tab 14d which is received in recess 16a of the stop member 16, as best seen in FIG. 2. The free end or tab 14d fits with predetermined axial clearance in the stop recess 16a so that the amount of deflection of the flange portion 14c is controlled as will be more fully explained herebelow. The stop member 16 is fastened to the fixed member 12 by a pair of socket head cap screws 18 received in corresponding threaded holes (not shown) in the fixed member.

As shown, the tool-carrying member 14 includes counterbores 14e for receiving the cap screws 22 fastening the fixed member to the spindle end and whose diameter is larger than that of the cap screws such that when the free end 14d of the flange portion moves there will be no interference of the tool-carrying member with the cap screws 22, i.e., there is a space 23 between the screws and the member 14.

The tool-carrying member also preferably includes an axially extending portion 14f terminating in an axial bar 14g having a pocket 14h to receive a cutting insert 30 or other suitable tool element. The axially extending portion 14f may be integral with flange portion 14c or preferably it is a separate component part attached to flange portion 14c by suitable means (not shown) such as machine screws or bolts. The cutting insert is held in the pocket 14h by suitable clamp means (not shown) known to those in the art. FIG. 2 shows the tool-carrying flange portion 14c in the undeflected position wherein the free end or tab 14d is not abutted against stop member 16. In this undeflected position, the cutting insert 30 is held in a retracted radial position relative to the spindle axis 54 out of contact with the workpiece bore wall W. FIG. 3 shows the tool-carrying flange portion 14c in deflecting engagement with the drawbar 70 and with the free end or tab 14d abutted axially against the stop member 16. It is apparent that the drawbar has been moved axially in FIG. 3 and that this movement has deflected the flange portion 14c from a plane generally parallel to support member 12 and spindle end 56 to an inclined plane away from the end 56 of the spindle in a radially swinging type movement about the fixed lateral portion 14a of the tool-carrying member, in particular about pivot line P. The amount of permissible deflection is controlled by the gap 16b between the free end 14d of the flange portion and the wall 16c defining the bottom of recess 16a of the stop member. In a typical embodiment, a gap of 0.010 inch has been used. It is apparent that deflection of the flange portion 14c in this manner has caused the cutting insert 30 to be positioned at a workpiece-engaging radial position radially farther from spindle axis 54 for cutting of the workpiece. An optional compression spring 17 is disposed in a counterbore 16d or other recess in stop member 16 to exert a biasing force on tool-carrying flange portion 14c toward the fixed member 12.

The operation of the boring tool 10 is evident from the above discussion. Briefly, during the boring operation, the drawbar 70 is moved axially into deflecting engagement with the flange portion 14c to cause the free end 14d thereof to abut the stop wall 16c as shown in FIG. 3. This places the cutting insert 30 in the extended radial position for cutting contact with the workpiece. When boring is completed, the drawbar 70 is moved axially into the spindle bore 58 to the position shown in FIG. 2. The resiliency of the flange portion 14c is sufficient to cause the flange portion to move or swing back to the parallel position shown in that figure. This motion places the cutting insert 30 in the retracted radial position closer to the spindle axis 54 out of contact with the finished workpiece bore wall W. The boring tool can then be withdrawn from the bore by moving the spindle axially out of the bore without a tool mark being formed on the finished wall W.

Thus, the present invention has provided a boring tool which is capable of positioning the tool element between a working position and retracted position and which is extremely simple and low cost in construction. The boring tool is additionally usable with boring machines in widespread use today.

While there have been described what are considered to be certain preferred embodiments of the invention, other modifications, additions and the like will occur to those skilled in the art and it is intended to cover in the appended claims all such modifications as fall within the true spirit and scope of the invention.

I claim:

1. A boring tool attachable to a rotary spindle having a spindle axis and drawbar means movable toward and away from the spindle along the spindle axis, said boring tool being characterized as having a resilient tool-carrying member and means for attaching the tool-carrying member to the spindle, said tool-carrying member extending transversely of the spindle axis in cantilever fashion in the path of the drawbar means for direct engagement thereby to resiliently deflect said tool-carrying member away from the spindle to position a tool thereon in a radial workpiece-engaging position relative to the spindle axis terminating in a transversely extending tab movable therewith out of the path of the drawbar means, said tool-carrying member positioning the tool thereon in a radial retracted position closer to the spindle axis when deflecting engagement is released by virtue of the resiliency of said tool-carrying member causing movement thereof toward the spindle, said boring tool further having stop means fixedly positioned out of the path of the drawbar means including a stop wall disposed axially a preselected distance from the tool-carrying member on a side thereof oppositely disposed from said spindle and against which stop wall said tab abuts when said tool-carrying member is deflected for controlling deflection of said tool-carrying member.

2. The boring tool of claim 1 wherein the attaching means comprises a lateral member fixed on the spindle and from which the tool-carrying member extends in cantilever fashion.

3. The boring tool of claim 2 which further includes a fixed support member attached to the spindle and on which the lateral member is fixed.

4. The boring tool of claim 3 wherein the fixed support member includes aperture means therethrough to receive the drawbar means and permit movement thereof through the fixed support member.

5. A boring tool for attachment to the end of a rotary spindle having a spindle axis and drawbar means movable toward and away from the end along the spindle axis, said boring tool comprising a fixed member adapted for attachment against the end of the spindle and having aperture means extending therethrough coaxial with the spindle axis to permit movement of the drawbar means through the fixed member, a tool-carrying member disposed adjacent the fixed member remote from the spindle end generally parallel to said fixed member and spindle end when undeflected, the tool-carrying member having a fixed lateral portion affixed against the fixed member and a resilient tool-carrying flange portion extending in cantilever fashion away from the fixed lateral portion transversely of the spindle axis in the path of the drawbar means for deflecting engagement thereby to resiliently deflect said flange portion away from the fixed member and terminating in a free end portion, said flange portion including an axially extending portion carrying a tool element in a radial workpiece-engaging position relative to the spindle axis when said flange portion is deflected by the drawbar means and in a radial retracted position closer to the spindle axis when deflecting engagement is released to allow the flange resiliency to move said flange portion toward the fixed member, and stop means on the fixed member including a recess for receiving said free end portion with preselected clearance for controlling deflection of said flange portion and thereby the radial position of the tool element carried thereon and spring means disposed between the free end portion and stop means.

6. The boring tool of claim 5 wherein the fixed member includes a plurality of holes of a first diameter aligned with a corresponding number of threaded holes in the spindle end and aligned with a corresponding number of counterbores in the tool-carrying member having a diameter larger than the first diameter and wherein screw means extend through the holes in the tool-carrying member and fixed member and are threadably received in the threaded holes of said spindle end, the diameter of the counterbores in the tool-carrying member being larger than the diameter of the screw means to allow deflection movement of said tool-carrying member without interfering with said screw means.

7. The boring tool of claim 5 wherein said fixed member is provided in the form of a circular disc having a central aperture extending therethrough and said tool-carrying member is provided in the form of a generally circular disc with the lateral portion thereof being defined by a chord intersecting the disc along one side thereof and with the flange portion being formed of the remainder of said disc having a reduced section size compared to the lateral portion.

8. In a boring machine, the combination of a hollow rotary spindle having a free end and a spindle axis, a drawbar means slidably disposed in the hollow spindle for movement toward and away from the spindle end along the spindle axis, and a boring tool attachable to the spindle end, said boring tool including a fixed member attached to the spindle end and having aperture means extending therethrough coaxial with the spindle axis to permit movement of the drawbar means therethrough and a resilient, tool-carrying member and means for attaching the tool-carrying member to the fixed member, said tool-carrying member including a fixed lateral portion affixed to the fixed member and a resilient, tool-carrying flange portion extending transversely of the spindle axis in cantilever fashion away from said fixed lateral portion and spaced from said spindle end in the path of the drawbar means for deflecting engagement thereby to resiliently deflect said flange portion away from said spindle end and terminating in a transversely extending tab, said flange portion including an axially extending portion positioning a tool thereon in a radial workpiece-engaging position relative to the spindle axis and positioning the tool thereon in a radial retracted position closer to the spindle axis when deflecting engagement is released by virtue of the resiliency of said flange portion causing movement thereof toward the spindle end, and stop means attached to the fixed member and including a recess for receiving said tab and further including a stop wall disposed axially a preselected distance from the tool-carrying member on a side thereof oppositely disposed from said fixed member and against which stop wall said tab abuts when said tool-carrying member is deflected for deflection control purposes.

9. The boring machine of claim 8 wherein the tool-carrying flange portion includes an axially extending portion carrying the tool thereon.

10. The boring machine of claim 8 wherein the tool-carrying member extends generally parallel to the spindle end when said tool-carrying member is undeflected.

* * * * *